US012617511B2

(12) United States Patent
Kato et al.

(10) Patent No.: US 12,617,511 B2
(45) Date of Patent: May 5, 2026

(54) OUTBOARD MOTOR AND MARINE VESSEL

(71) Applicant: YAMAHA HATSUDOKI KABUSHIKI KAISHA, Iwata (JP)

(72) Inventors: Yosuke Kato, Shizuoka (JP); Masaya Oishi, Shizuoka (JP); Masashi Nonaka, Shizuoka (JP); Shintaro Aoyagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 417 days.

(21) Appl. No.: 18/482,061

(22) Filed: Oct. 6, 2023

(65) Prior Publication Data

US 2024/0124114 A1 Apr. 18, 2024

(30) Foreign Application Priority Data

Oct. 18, 2022 (JP) ................................ 2022-166931

(51) Int. Cl.

*B63H 20/00* (2006.01)
*F02D 29/02* (2006.01)
*F02D 41/30* (2006.01)

(52) U.S. Cl.

CPC ........... *B63H 20/001* (2013.01); *F02D 29/02* (2013.01); *F02D 41/3082* (2013.01); *F02D 2700/0215* (2013.01)

(58) Field of Classification Search

CPC ...................... B63H 20/001; F02D 2700/0215
See application file for complete search history.

(56) References Cited

FOREIGN PATENT DOCUMENTS

| | | | | |
|---|---|---|---|---|
| EP | 3550132 A1 * | 10/2019 | ............ | F02D 15/02 |
| JP | 2001-132573 A | 5/2001 | | |
| WO | WO-2020153312 A1 * | 7/2020 | ......... | F02D 41/3863 |

OTHER PUBLICATIONS

Translation of WO-2020153312 (Year: 2020).*

* cited by examiner

*Primary Examiner* — Timothy D Collins
(74) *Attorney, Agent, or Firm* — Keating & Bennett, LLP

(57) ABSTRACT

An outboard motor includes an engine, a fuel pump to draw fuel into an outboard motor body from a fuel tank installed on a hull, a temporary storage tank to temporarily store the fuel drawn into the outboard motor body by the fuel pump, a fuel injector to inject the fuel stored in the temporary storage tank into the engine, a temperature sensor on the temporary storage tank to detect a temperature of the fuel stored in the temporary storage tank, and a controller configured or programmed to perform a control to limit an engine speed to no more than a predetermined upper limit rotation speed based on a detection result of the temperature sensor while the engine is running.

20 Claims, 3 Drawing Sheets

OUTBOARD MOTOR AND MARINE VESSEL

CROSS REFERENCE TO RELATED APPLICATIONS

This application claims the benefit of priority to Japanese Patent Application No. 2022-166931 filed on Oct. 18, 2022. The entire contents of this application are hereby incorporated herein by reference.

BACKGROUND OF THE INVENTION

1. Field of the Invention

The present invention relates to an outboard motor and a marine vessel.

2. Description of the Related Art

An outboard motor and a marine vessel each including a temporary storage tank connected to a fuel injector are known in general. Such an outboard motor and a marine vessel are disclosed in Japanese Patent Laid-Open No. 2001-132573, for example.

Japanese Patent Laid-Open No. 2001-132573 discloses an outboard motor including a low-pressure fuel pump to pump fuel from a fuel tank installed on a hull, a temporary storage tank installed in the vicinity of an engine, and a temperature sensor and a high-pressure fuel pump installed on and in the temporary storage tank. Fuel is supplied from the fuel tank to the temporary storage tank by the low-pressure fuel pump, and the temporary storage tank delivers the fuel to an injection nozzle by the high-pressure fuel pump. The temperature sensor detects the temperature of the fuel in the temporary storage tank.

The outboard motor further includes a controller to control driving of the high-pressure fuel pump when the engine is started based on the detected value of the temperature sensor during stopping of the engine.

Although not clearly described in Japanese Patent Laid-Open No. 2001-132573, in the outboard motor field it is known in general that while the engine is running the fuel in the temporary storage tank vaporizes due to an excessive increase in the temperature of the fuel in the temporary storage tank caused by an increase in the temperature of the engine. In such a case, a pressure in the temporary storage tank increases, and it becomes difficult to pump fuel from the fuel tank to the temporary storage tank. In other words, a so-called vapor lock occurs. Consequently, a decrease in an engine speed not intended or desired by a user may occur due to insufficient fuel supply. When such an issue is considered in the outboard motor disclosed in Japanese Patent Laid-Open No. 2001-132573, the controller controls driving of the high-pressure fuel pump when the engine is started, not while the engine is running, and thus the issue in a state in which the engine is running as described above is not resolved. Therefore, even in the outboard motor disclosed in Japanese Patent Laid-Open No. 2001-132573, when the temperature of the fuel in the temporary storage tank increases, it becomes difficult to pump fuel from the fuel tank to the temporary storage tank, and there is concern that a decrease in the engine speed not intended or desired by the user may occur. Thus, improvement is required.

SUMMARY OF THE INVENTION

Preferred embodiments of the present invention provide outboard motors and marine vessels that each reduce or prevent decreases in engine speeds not intended or desired by users caused by insufficient fuel supplies to temporary storage tanks due to the difficulty in pumping fuel from fuel tanks to the temporary storage tanks caused by vaporization of the fuel in the temporary storage tanks while engines are running.

An outboard motor according to a preferred embodiment of the present invention includes an engine, a fuel pump to draw fuel into an outboard motor body from a fuel tank installed on a hull, a temporary storage tank to temporarily store the fuel drawn into the outboard motor body by the fuel pump, a fuel injector to inject the fuel stored in the temporary storage tank into the engine, a temperature sensor on the temporary storage tank to detect a temperature of the fuel stored in the temporary storage tank, and a controller configured or programmed to perform a control to limit an engine speed to no more than a predetermined upper limit rotation speed based on a detection result of the temperature sensor while the engine is running.

An outboard motor according to a preferred embodiment of the present invention includes a controller configured or programmed to perform a control to limit the engine speed to no more than the predetermined upper limit rotation speed based on the detection result of the temperature sensor operable to detect the temperature of the fuel stored in the temporary storage tank while the engine is running. Accordingly, the engine speed is limited to the predetermined upper limit rotation speed based on the temperature of the fuel in the temporary storage tank detected by the temperature sensor, and thus an excessive increase in the temperature of the engine is prevented. Thus, the fuel in the temporary storage tank is prevented from reaching a temperature at which it evaporates due to an excessive increase in the temperature of the engine. Furthermore, the engine speed is limited to no more than the predetermined upper limit rotation speed such that the amount of fuel consumed by the engine is reduced, and a period of time until all the fuel in the temporary storage tank is consumed is increased. Consequently, the fuel is pumped from the fuel tank and mixed with the temperature-raised fuel in the temporary storage tank during the increased period of time such that the temperature of the fuel in the temporary storage tank is effectively lowered. Thus, a decrease in the engine speed not intended or desired by a user, caused by an insufficient fuel supply to the temporary storage tank due to the difficulty (so-called vapor lock) in pumping the fuel from the fuel tank to the temporary storage tank caused by vaporization of the fuel in the temporary storage tank while the engine is running, is reduced or prevented.

In an outboard motor according to a preferred embodiment of the present invention, a controller is preferably configured or programmed to perform a control to limit the engine speed to no more than the upper limit rotation speed when the temperature of the fuel detected by the temperature sensor is equal to or higher than a threshold temperature. Accordingly, the threshold temperature is set as the temperature of the fuel in the temporary storage tank, and thus an increase in the temperature of the fuel in the temporary storage tank is further reduced or prevented, and the difficulty (so-called vapor lock) in pumping the fuel from the fuel tank to the temporary storage tank caused by vaporization of the fuel in the temporary storage tank is further reduced or prevented.

In such a case, the controller is preferably configured or programmed to perform a control to decrease the upper limit rotation speed as the temperature of the fuel increases to the threshold temperature or above. Accordingly, as the fuel has a higher temperature equal to or higher than the threshold temperature, the engine speed is limited to a lower speed, and thus an excessive increase in the temperature of the engine is more effectively reduced or prevented such that the temperature of the fuel in the temporary storage tank is more effectively lowered.

In an outboard motor including the controller configured or programmed to perform a control to decrease the upper limit rotation speed as the temperature of the fuel increases, a controller is preferably configured or programmed to perform a control to maintain the upper limit rotation speed at a constant minimum upper limit rotation speed, smaller than the upper limit rotation speed at which the fuel is at the threshold temperature when the temperature of the fuel is equal to or higher than an upper limit temperature higher than the threshold temperature. Accordingly, even when the temperature of the fuel in the temporary storage tank becomes equal to or higher than the upper limit temperature higher than the threshold temperature, the maximum value of the engine speed is maintained at the minimum upper limit rotation speed. Consequently, when the temperature of the fuel in the temporary storage tank is equal to or higher than the upper limit temperature, the maximum value of the limited engine speed is prevented from becoming too small.

In an outboard motor including a controller configured or programmed to perform a control to limit the engine speed to no more than the upper limit rotation speed, the controller is preferably configured or programmed to limit the engine speed to no more than the upper limit rotation speed, and cancel a limitation on the engine speed being the upper limit rotation speed when the temperature of the fuel detected by the temperature sensor becomes lower than the threshold temperature. Accordingly, the limitation on the engine speed being the upper limit rotation speed is canceled when the temperature of the fuel detected by the temperature sensor drops below the threshold temperature. Therefore, the limitation on the engine speed being the upper limit rotation speed is canceled when the fuel in the temporary storage tank is less likely to vaporize (when a so-called vapor lock is less likely to occur).

In such a case, the controller is preferably configured or programmed to cancel the limitation on the engine speed being the upper limit rotation speed when the temperature of the fuel detected by the temperature sensor becomes lower than the threshold temperature and the engine speed becomes equal to or lower than a predetermined cancel rotation speed lower than the upper limit rotation speed. Accordingly, the limitation on the engine speed being the upper limit rotation speed is not canceled when the engine speed is relatively high, and thus the possibility of another limitation on the engine speed being the upper limit rotation speed due to an excess of the temperature of the fuel detected by the temperature sensor over the threshold temperature immediately after cancellation of the limitation on the engine speed being the upper limit rotation speed is reduced or prevented.

In an outboard motor according to a preferred embodiment of the present invention, a controller is preferably configured or programmed to cancel a limitation on the engine speed being the upper limit rotation speed when a predetermined period of time has elapsed since a start of the limitation on the engine speed being the upper limit rotation speed. Accordingly, after the predetermined period of time has elapsed in a state in which the engine speed is relatively low to not exceed the upper limit rotation speed, the limitation on the engine speed being the upper limit rotation speed is canceled in a state in which the temperature of the fuel detected by the temperature sensor is lowered.

An outboard motor according to a preferred embodiment of the present invention preferably further includes a notifier to notify a user that a limitation on the engine speed being the upper limit rotation speed has started when the limitation by the upper limit rotation speed has started. Accordingly, the user easily recognizes that the limitation on the engine speed being the upper limit rotation speed has started.

In such a case, an outboard motor preferably further includes a manual pump between the fuel tank and the temporary storage tank to be manually driven to deliver the fuel from the fuel tank into the temporary storage tank, and the notifier preferably includes a display to display a predetermined message to prompt the user to manually drive the manual pump when the limitation on the engine speed being the upper limit rotation speed continues without being canceled. Accordingly, the predetermined message on the display allows the user to easily visually recognize that the limitation on the engine speed being the upper limit rotation speed is not canceled, and the manual pump is used to manually deliver the fuel from the fuel tank into the temporary storage tank such that the temperature of the fuel in the temporary storage tank is lowered.

In an outboard motor according to a preferred embodiment of the present invention, a temperature sensor is preferably in contact with an outer surface of the temporary storage tank to detect the temperature of the fuel via the outer surface. Accordingly, the temperature sensor is operable to detect the temperature of the fuel without directly contacting the fuel, and thus a decrease in detection accuracy due to adhesion of foreign matter in the fuel to the temperature sensor, for example, is prevented.

In such a case, the temperature sensor is preferably on a lower side of the temporary storage tank in contact with the outer surface of the temporary storage tank. Accordingly, the temperature sensor on the lower side of the temporary storage tank accurately detects the temperature of the fuel even when the amount of fuel in the temporary storage tank is small.

In an outboard motor including a controller configured or programmed to perform a control to decrease the upper limit rotation speed as the temperature of the fuel increases, the controller is preferably configured or programmed to perform a control to change the upper limit rotation speed to within an engine speed range including at least a portion of a range of about 4,000 rpm or more and about 6,000 rpm or less. Accordingly, the engine speed is limited to no more than the upper limit rotation speed such that a decrease in the engine speed not intended or desired by the user, caused by an insufficient fuel supply to the temporary storage tank due to the difficulty (so-called vapor lock) in pumping the fuel from the fuel tank to the temporary storage tank caused by vaporization of the fuel in the temporary storage tank, is reduced or prevented.

A marine vessel according to a preferred embodiment of the present invention includes a hull and an outboard motor installed on the hull. The outboard motor includes an engine, a fuel pump to draw fuel into an outboard motor body from a fuel tank installed on the hull, a temporary storage tank to temporarily store the fuel drawn into the outboard motor body by the fuel pump, a fuel injector to inject the fuel stored in the temporary storage tank into the engine, a temperature sensor on the temporary storage tank to detect a temperature of the fuel stored in the temporary storage tank, and a controller configured or programmed to perform a control to limit an engine speed to no more than a predetermined upper limit rotation speed based on a detection result of the temperature sensor while the engine is running.

A marine vessel according to a preferred embodiment of the present invention includes a controller configured or programmed to perform a control to limit the engine speed to no more than the predetermined upper limit rotation speed based on the detection result of the temperature sensor operable to detect the temperature of the fuel stored in the temporary storage tank while the engine is running. Accordingly, the engine speed is limited to the predetermined upper limit rotation speed based on the temperature of the fuel in the temporary storage tank detected by the temperature sensor, and thus an excessive increase in the temperature of the engine is prevented. Thus, the fuel in the temporary storage tank is prevented from reaching a temperature at which it evaporates due to an excessive increase in the temperature of the engine. Furthermore, the engine speed is limited to no more than the predetermined upper limit rotation speed such that the amount of fuel consumed by the engine is reduced, and a period of time until all the fuel in the temporary storage tank is consumed is increased. Consequently, the fuel is pumped from the fuel tank and mixed with the temperature-raised fuel in the temporary storage tank during the increased period of time such that the temperature of the fuel in the temporary storage tank is effectively lowered. Thus, a decrease in the engine speed not intended or desired by a user, caused by an insufficient fuel supply to the temporary storage tank due to the difficulty (so-called vapor lock) in pumping the fuel from the fuel tank to the temporary storage tank caused by vaporization of the fuel in the temporary storage tank while the engine is running, is reduced or prevented.

In a marine vessel according to a preferred embodiment of the present invention, the controller is preferably configured or programmed to perform a control to limit the engine speed to no more than the upper limit rotation speed when the temperature of the fuel detected by the temperature sensor is equal to or higher than a threshold temperature. Accordingly, the threshold temperature is set as the temperature of the fuel in the temporary storage tank, and thus an increase in the temperature of the fuel in the temporary storage tank is further reduced or prevented, and the difficulty (so-called vapor lock) in pumping the fuel from the fuel tank to the temporary storage tank caused by vaporization of the fuel in the temporary storage tank is further reduced or prevented.

In such a case, the controller is preferably configured or programmed to perform a control to decrease the upper limit rotation speed as the temperature of the fuel increases to the threshold temperature or above. Accordingly, as the fuel has a higher temperature equal to or higher than the threshold temperature, the engine speed is limited to a lower speed, and thus an excessive increase in the temperature of the engine is more effectively reduced or prevented such that the temperature of the fuel in the temporary storage tank is more effectively lowered.

In a marine vessel including a controller configured or programmed to perform a control to decrease the upper limit rotation speed as the temperature of the fuel increases, the controller is preferably configured or programmed to perform a control to maintain the upper limit rotation speed at a constant minimum upper limit rotation speed, smaller than the upper limit rotation speed at which the fuel is at the threshold temperature when the temperature of the fuel is equal to or higher than an upper limit temperature higher than the threshold temperature. Accordingly, even when the temperature of the fuel in the temporary storage tank becomes equal to or higher than the upper limit temperature higher than the threshold temperature, the maximum value of the engine speed is maintained at the minimum upper limit rotation speed. Consequently, when the temperature of the fuel in the temporary storage tank is equal to or higher than the upper limit temperature, the maximum value of the limited engine speed is prevented from becoming too small.

In a marine vessel including a controller configured or programmed to perform a control to limit the engine speed to no more than the upper limit rotation speed, the controller is preferably configured or programmed to limit the engine speed to no more than the upper limit rotation speed, and cancel a limitation on the engine speed being the upper limit rotation speed when the temperature of the fuel detected by the temperature sensor becomes lower than the threshold temperature. Accordingly, the limitation on the engine speed being the upper limit rotation speed is canceled when the temperature of the fuel detected by the temperature sensor drops below the threshold temperature. Therefore, the limitation on the engine speed being the upper limit rotation speed is canceled when the fuel in the temporary storage tank is less likely to vaporize (when a so-called vapor lock is less likely to occur).

In such a case, the controller is preferably configured or programmed to cancel the limitation on the engine speed being the upper limit rotation speed when the temperature of the fuel detected by the temperature sensor becomes lower than the threshold temperature and the engine speed becomes equal to or lower than a predetermined cancel rotation speed lower than the upper limit rotation speed. Accordingly, the limitation on the engine speed being the upper limit rotation speed is not canceled when the engine speed is relatively high, and thus the possibility of another limitation on the engine speed being the upper limit rotation speed due to an excess of the temperature of the fuel detected by the temperature sensor over the threshold temperature immediately after cancellation of the limitation on the engine speed being the upper limit rotation speed is reduced or prevented.

In a marine vessel according to a preferred embodiment of the present invention, the controller is preferably configured or programmed to cancel a limitation on the engine speed being the upper limit rotation speed when a predetermined period of time has elapsed since a start of the limitation on the engine speed being the upper limit rotation speed. Accordingly, after the predetermined period of time has elapsed in a state in which the engine speed is relatively low to not exceed the upper limit rotation speed, the limitation on the engine speed being the upper limit rotation speed is canceled in a state in which the temperature of the fuel detected by the temperature sensor is lowered.

In such a case, the outboard motor preferably further includes a notifier to notify a user that a limitation on the engine speed being the upper limit rotation speed has started when the limitation by the upper limit rotation speed has started. Accordingly, the user easily recognizes that the limitation on the engine speed being the upper limit rotation speed has started.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 including an outboard motor 102 according to preferred embodiments of the present invention is now described with reference to FIGS. 1 to 6.

In the figures, arrow FWD represents the forward movement direction of the marine vessel 100, and arrow BWD represents the reverse movement direction of the marine vessel 100. Arrow R represents the starboard direction of the marine vessel 100, and arrow L represents the portside direction of the marine vessel 100.

The marine vessel 100 includes a hull 101 and the outboard motor 102. The outboard motor 102 is installed at a stern (transom) of the hull 101 via a bracket.

The marine vessel 100 includes a fuel tank 101*a*. As an example, the fuel tank 101*a* is located at the bottom of the hull 101.

Generally, in a marine vessel, when an engine speed increases, the temperature of fuel in a temporary storage tank (vapor separator tank) attached to the side of an engine of an outboard motor increases. In the marine vessel, as the temperature of the fuel in the temporary storage tank increases, the fuel vaporizes in the temporary storage tank, for example, such that it may become difficult to suction fuel from a fuel tank (a so-called vapor lock may occur). Consequently, the marine vessel suffers from insufficient fuel supply, and a decrease in the engine speed not intended or desired by a user occurs.

Figure 1:
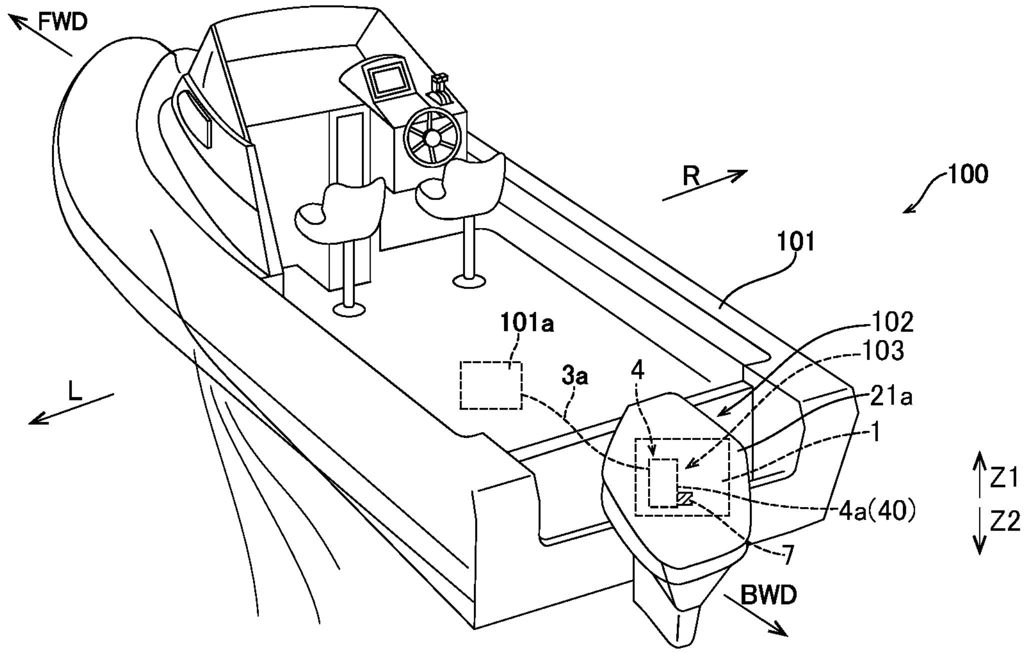
FIG. 1 is a perspective view showing a marine vessel including an outboard motor according to a preferred embodiment of the present invention.
Figure 2:
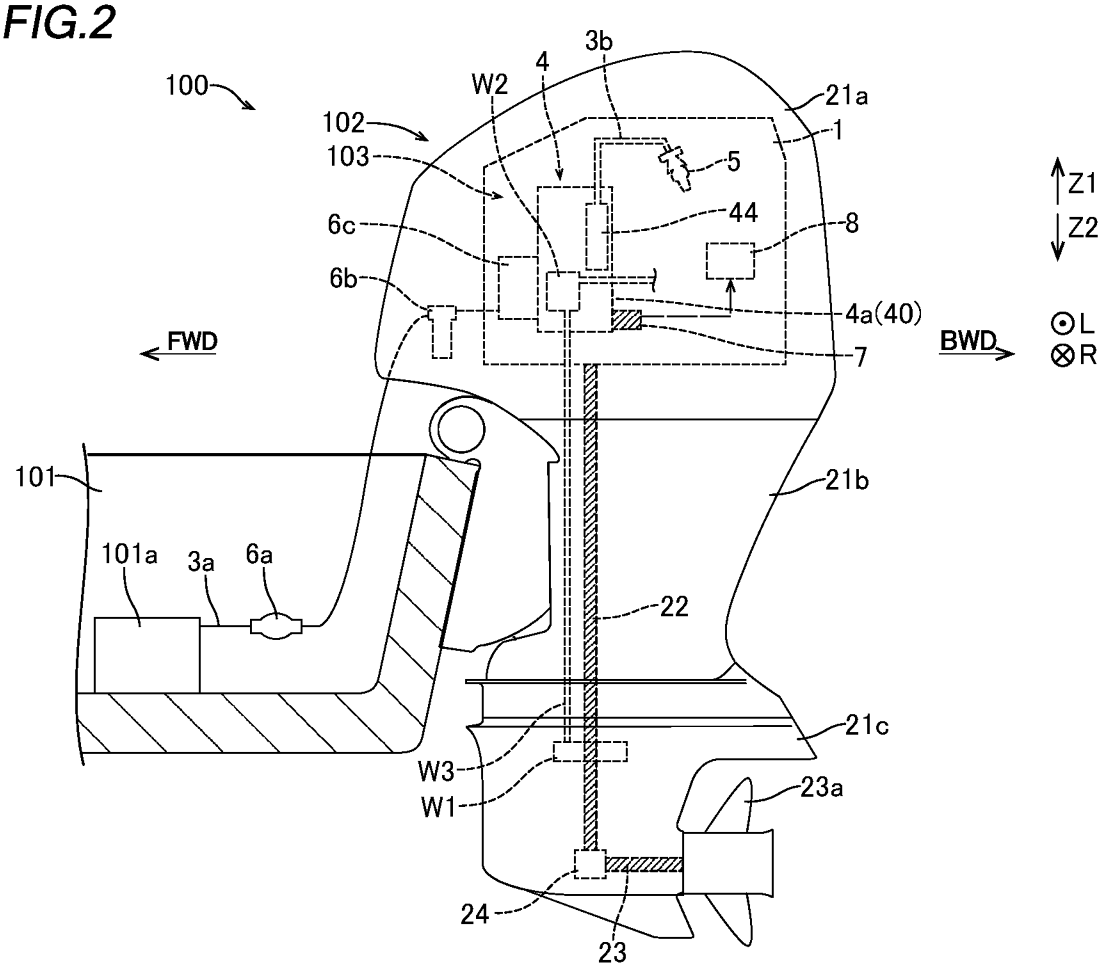
FIG. 2 is a side view showing a hull and an outboard motor according to a preferred embodiment of the present invention.

Therefore, the marine vessel 100 (a controller 8 of the outboard motor 102) according to preferred embodiments of the present invention shown in FIGS. 1 and 2 performs a control to reduce or prevent a decrease in the engine speed not intended or desired by the user when the temperature sensor 7 detects a predetermined increase in the temperature of fuel in a temporary storage tank 4. The details are described below.

Figure 3:
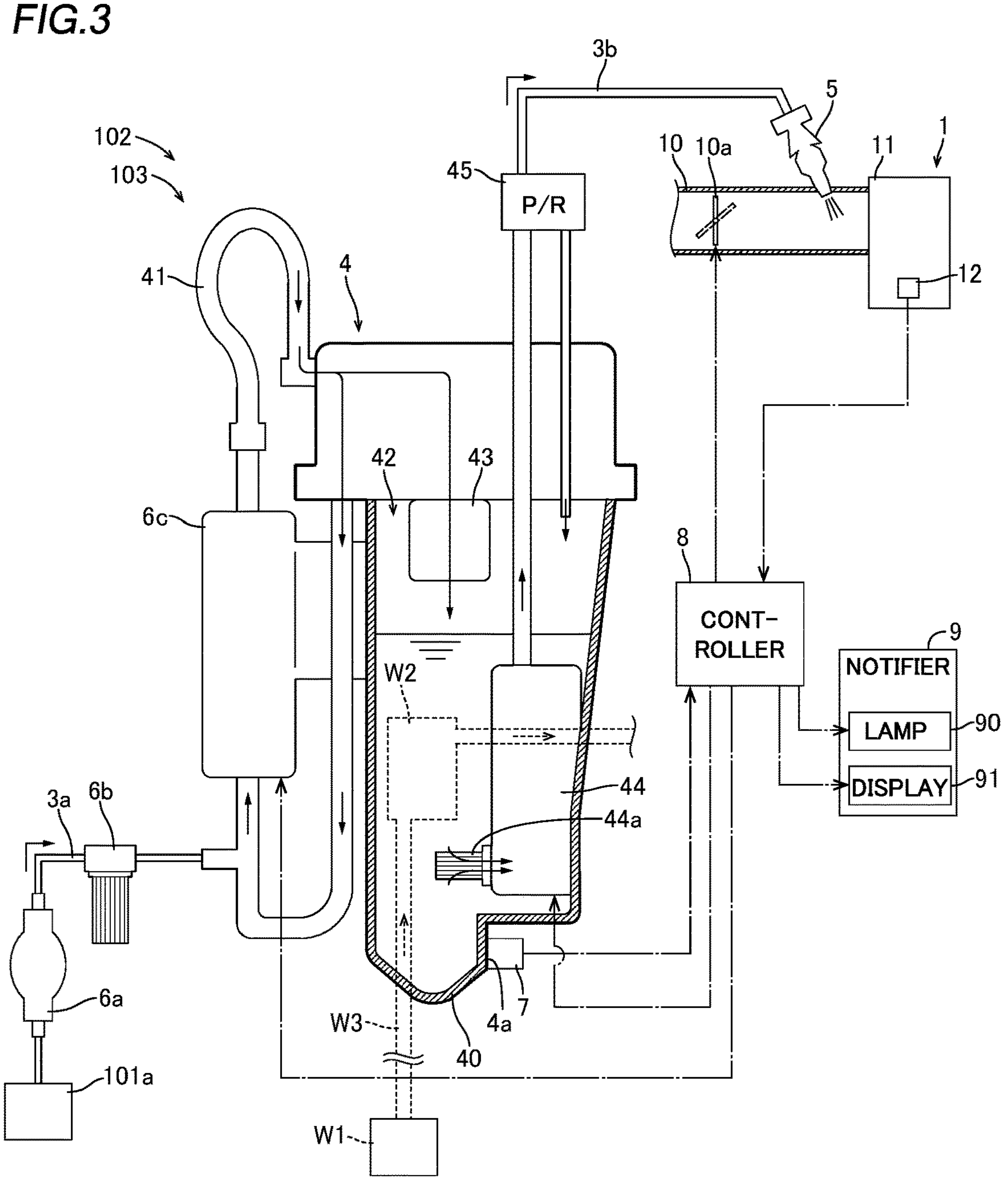
FIG. 3 is a configuration diagram showing a fuel supply system of an outboard motor according to a preferred embodiment of the present invention.

As shown in FIGS. 1 to 3, the outboard motor 102 includes a fuel supply system 103. The fuel supply system 103 pumps fuel from the fuel tank 101*a* installed on the hull 101 and supplies the fuel into an engine 1. The fuel supply system 103 is described below in detail.

The outboard motor 102 also includes the engine 1, a cowling 21*a*, an upper case 21*b*, and a lower case 21*c*. The outboard motor 102 also includes a drive shaft 22 to transmit a driving force of the engine 1, a propeller shaft 23 including a propeller 23*a*, and a water pump W1.

The engine 1 is located inside the cowling 21*a*. The temporary storage tank 4 is attached to a side surface of the engine 1. Therefore, the temporary storage tank 4 is located at a position at which the temperature of the temporary storage tank 4 is likely to increase due to the heat of the engine 1.

The engine 1 includes an intake passage 10 including a throttle valve 10*a*, a cylinder 11 to which a mixture of fuel and air is supplied from the intake passage 10, and a rotation speed sensor 12 to detect an engine speed. As an example, the rotation speed sensor 12 is a sensor that detects the rotation angle of a crankshaft. A gear unit 24 that switches a shift state and the propeller shaft 23, for example, are provided inside the lower case 21*c*.

The water pump W1 pumps water from the outside of the hull 101 and supplies the water to objects to be cooled such as the engine 1 and the temporary storage tank 4 through a cooling water passage W3.

The fuel supply system 103 of the outboard motor 102 shown in FIG. 3 supplies the fuel from the fuel tank 101*a* to the engine 1.

The fuel supply system 103 of the outboard motor 102 includes an upstream fuel pipe 3*a*, a downstream fuel pipe 3*b*, the temporary storage tank 4, and a fuel injector 5.

The upstream fuel pipe 3*a* connects the temporary storage tank 4 to the fuel tank 101*a*. The downstream fuel pipe 3*b* connects the temporary storage tank 4 to the fuel injector 5. The temporary storage tank 4 temporarily stores fuel drawn into the outboard motor body by a low-pressure fuel pump 6*c*.

The fuel flows from the upstream side to the downstream side in the order of the fuel tank 101*a*, the upstream fuel pipe 3*a*, the temporary storage tank 4, the downstream fuel pipe 3*b*, the fuel injector 5, and the engine 1.

The fuel injector 5 injects the fuel stored in the temporary storage tank 4 into the engine 1. Specifically, the fuel injector 5 injects the fuel into the intake passage 10 of the engine 1. The fuel injector may directly inject the fuel into the cylinder of the engine. That is, the fuel injector may be a so-called direct injection type.

The fuel supply system 103 includes a manual pump 6*a*, a water separation filter 6*b*, and the low-pressure fuel pump 6*c*. The low-pressure fuel pump 6*c* is an example of a "fuel pump".

The manual pump 6*a* is provided outside the cowling 21*a*. The manual pump 6*a* is located in the middle of the upstream fuel pipe 3*a*. The manual pump 6*a* is located between the fuel tank 101*a* and the temporary storage tank 4. The manual pump 6*a* is manually driven to deliver the fuel from the fuel tank 101*a* to the temporary storage tank 4. As an example, the manual pump 6*a* includes a compressor that generates a negative pressure when compressed by the user, and draws in the fuel by the negative pressure of the compressor.

The water separation filter 6*b* is provided inside the cowling 21*a*. The water separation filter 6*b* is located in the middle of the upstream fuel pipe 3*a*. The water separation filter 6*b* is located between the fuel tank 101*a* and the temporary storage tank 4. The water separation filter 6*b* removes water contained in the fuel within the fuel tank 101*a*.

The low-pressure fuel pump 6*c* is provided inside the cowling 21*a*. The low-pressure fuel pump 6*c* is installed on the outer surface 4*a* of the temporary storage tank 4. The low-pressure fuel pump 6*c* draws the fuel from the fuel tank

101*a* provided on the hull 101 into an outboard motor body (temporary storage tank 4). The low-pressure fuel pump 6*c* is electrically driven. The low-pressure fuel pump may be driven by the driving force of the engine.

The fuel supply system 103 includes a temperature sensor 7, the controller 8, and a notifier 9.

The temperature sensor 7 is provided on the temporary storage tank 4. The temperature sensor 7 detects the temperature of the fuel stored in the temporary storage tank 4. The temperature sensor 7 is provided in contact with the outer surface 4*a* of the temporary storage tank 4 (housing 40). The temperature sensor 7 detects the temperature of the fuel via the outer surface 4*a*. Moreover, the temperature sensor 7 is provided on the lower side of the temporary storage tank 4 in contact with the outer surface 4*a* of the temporary storage tank 4.

As a result of earnest studies, the inventors of preferred embodiments of the present invention have discovered that the temperature of the outer surface 4*a* of the temporary storage tank 4 of the outboard motor 102 and the temperature of the fuel in the temporary storage tank 4 are substantially the same. Therefore, in the outboard motor 102 according to preferred embodiments of the present invention, the temperature sensor 7 detects the temperature of the fuel in the temporary storage tank 4 without directly contacting the fuel.

The controller 8 performs a control to limit the engine speed to no more than a predetermined upper limit rotation speed R1 (see FIG. 5) based on the detection result of the temperature sensor 7 while the engine 1 is running. Consequently, a decrease in the engine speed not intended or desired by the user is reduced or prevented. The controller 8 adjusts the engine speed by adjusting the opening degree of the throttle valve 10*a*. The control contents executed by the controller 8 are described below in detail.

The controller 8 is connected by signal lines to the temperature sensor 7, the rotation speed sensor 12, the low-pressure fuel pump 6*c*, a high-pressure fuel pump 44 provided in the temporary storage tank 4, an actuator (not shown) for the throttle valve 10*a*, and the notifier 9.

The controller 8 acquires a detected value of the temperature of the fuel from the temperature sensor 7. Also, the controller 8 acquires a detected value of the engine speed from the rotation speed sensor 12. The controller 8 transmits a signal to control driving to each of the low-pressure fuel pump 6*c*, the high-pressure fuel pump 44, the actuator for the throttle valve 10*a*, and the notifier 9.

As an example, the controller 8 includes a central processing unit (CPU) and a memory that stores various programs. The CPU executes the programs stored in the memory, for example, such that the controller 8 executes various control processes. As a specific example, the controller 8 includes an engine control unit.

The notifier 9 includes a lamp 90 and a display 91. The lamp 90 and the display 91 may be provided on the outboard motor body side, or may be provided on the operator's seat side.

The lamp 90 notifies the user that a limitation of the upper limit rotation speed R1 has started when the controller 8 has started to limit the engine speed to the upper limit rotation speed R1. As a specific example, the lamp 90 switches from a non-lit state to a continuously lit state or a flash lit state when the controller 8 has started to limit the engine speed to the upper limit rotation speed R1.

The display 91 provides a predetermined display indicating that a limitation of the upper limit rotation speed R1 has started when the controller 8 has started to limit the engine speed to the upper limit rotation speed R1. As a specific example, the display 91 displays a message such as "the upper limit of the engine speed has been limited to XXX rpm" when the controller 8 has started to limit the engine speed to the upper limit rotation speed R1.

Figure 4:
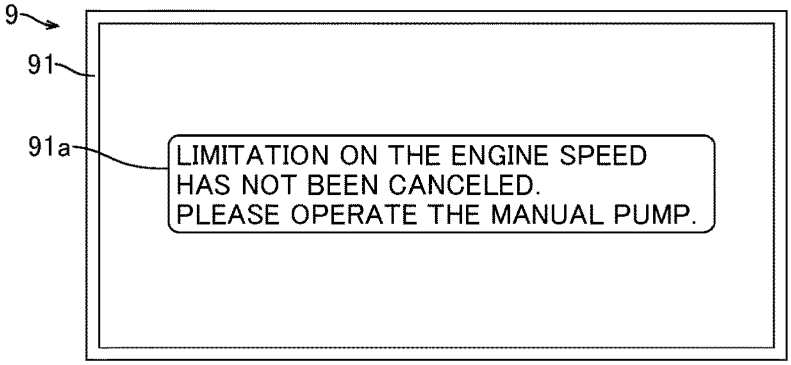
FIG. 4 is a diagram illustrating a message displayed on a display of a notifier of an outboard motor according to a preferred embodiment of the present invention.

As shown in FIG. 4, the display 91 displays a predetermined message 91*a* to prompt the user to manually drive the manual pump 6*a* when the limitation on the engine speed being the upper limit rotation speed R1 continues without being canceled. The expression "when a limitation on the engine speed being the upper limit rotation speed R1 continues without being canceled" indicates when a predetermined period of time has elapsed since the start of the limitation on the engine speed being the upper limit rotation speed R1. The details are described below.

In short, the display 91 displays the predetermined message 91*a* to prompt the user to manually drive the manual pump 6*a* when a state in which the controller 8 does not cancel the limitation on the engine speed being the upper limit rotation speed R1 (a state in which it is difficult for the low-pressure fuel pump 6*c* to suction the fuel from the fuel tank 101*a*) continues for a relatively long time. As a specific example, the display 91 displays a pop-up message "LIMITATION ON THE ENGINE SPEED HAS NOT BEEN CANCELED. PLEASE OPERATE THE MANUAL PUMP." as the predetermined message 91*a*.

The temporary storage tank 4 shown in FIG. 3 is attached to the side surface of the engine 1, as described above. The temporary storage tank 4 includes the housing 40, an annular pipe 41 through which the fuel circulates, a fuel chamber 42, and a float valve 43, and the high-pressure fuel pump 44 located in the fuel chamber 42.

The temperature sensor 7 is provided on the outer surface 4*a* of the housing 40 in contact with the outer surface 4*a*. Specifically, the housing 40 is located with the temperature sensor 7 in contact with the lower outer surface 4*a* that is a portion of an inner wall defining the fuel chamber 42. That is, the temperature sensor 7 is provided at a position facing the fuel in the fuel chamber 42 via a wall (lower outer surface 4*a*) defining the fuel chamber 42.

A fuel cooler W2 is provided in the housing 40. The fuel cooler W2 is connected to the cooling water passage W3, and cooling water is supplied from the water pump W1 to the fuel cooler W2. The fuel cooler W2 is a jacket that circulates water and temporarily stores water in the housing 40.

The annular pipe 41 is connected to the low-pressure fuel pump 6*c*, and is a portion of the temporary storage tank 4 into which the fuel is first introduced.

The float valve 43 regulates the maximum amount of fuel stored in the fuel chamber 42. Specifically, the float valve 43 closes when the amount of fuel in the fuel chamber 42 reaches a predetermined maximum amount, and cuts off the connection between the annular pipe 41 and the fuel chamber 42. Consequently, the fuel is not able to flow from the annular pipe 41 into the fuel chamber 42. In such a case, the fuel drawn from the fuel tank 101*a* by the low-pressure fuel pump 6*c* circulates through the annular pipe 41 without flowing into the fuel chamber 42.

The float valve 43 opens when the amount of fuel in the fuel chamber 42 is less than the predetermined maximum amount, and connects the annular pipe 41 to the fuel chamber 42 to allow the fuel to flow from the annular pipe 41 into the fuel chamber 42.

The high-pressure fuel pump 44 is located in the fuel chamber 42 while being immersed in the fuel. The high-pressure fuel pump 44 suctions the fuel through a foreign matter filter 44*a* and pumps the fuel toward the fuel injector 5 through the downstream fuel pipe 3*b*.

A pressure regulator 45 is provided in the downstream fuel pipe 3*b*. The pressure regulator 45 adjusts the pressure of the fuel to be injected from the fuel injector 5 by returning a portion of the fuel pumped by the high-pressure fuel pump 44 to the fuel chamber 42.

Figure 5:
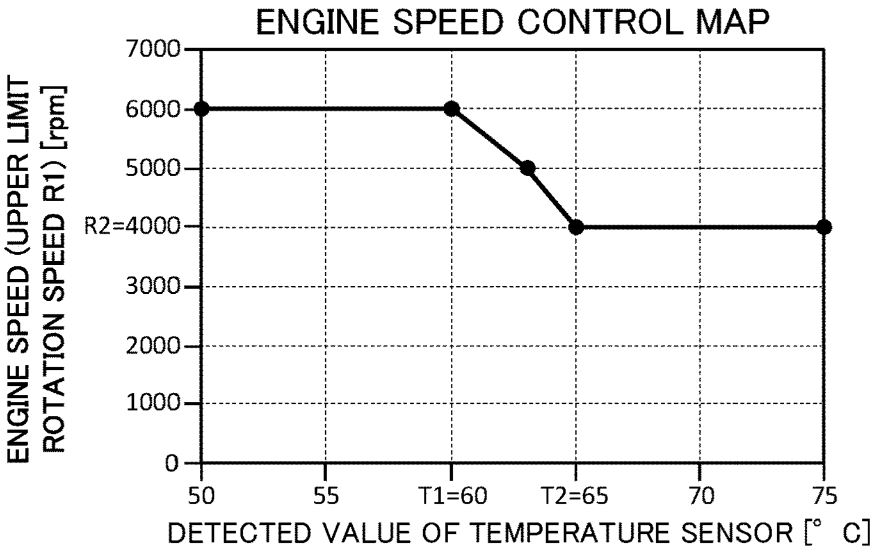
FIG. 5 is a graph illustrating a relationship (engine speed control map) between an engine speed controlled by a controller of an outboard motor and a detected value of a temperature sensor according to a preferred embodiment of the present invention.

A control performed by the controller 8 to limit the engine speed to the upper limit rotation speed R1 is now described with reference to FIG. 5.

The controller 8 performs a control to limit the engine speed to no more than the upper limit rotation speed R1 when the temperature of the fuel detected by the temperature sensor 7 is equal to or higher than a threshold temperature T1. As an example, the threshold temperature T1 is 60° C. When the threshold temperature T1 is 60° C., the upper limit rotation speed R1 is 6,000 rpm.

That is, the controller 8 performs a control to limit the engine speed to no more than the upper limit rotation speed R1 in order to lower the temperature of the temporary storage tank 4 when determining that the temperature of the temporary storage tank 4 detected by the temperature sensor 7 is a temperature at which a so-called vapor lock is likely to occur.

In such a case, the controller 8 performs a control to decrease the upper limit rotation speed R1 as the temperature of the fuel increases to the threshold temperature T1 or above.

At this time, the controller 8 performs a control to change the upper limit rotation speed R1 to within an engine speed range including at least a portion of a range of about 4,000 rpm or more and about 6,000 rpm or less.

As a specific example, the controller 8 performs a control to change the upper limit rotation speed R1 from 6,000 rpm to 5,000 rpm when the temperature of the temporary storage tank 4 detected by the temperature sensor 7 changes from 60° C., which is the threshold temperature T1, or higher to lower than 63° C. When the temperature of the temporary storage tank 4 detected by the temperature sensor 7 is within a temperature range of 60° C. to 63° C., the controller 8 changes the upper limit rotation speed R1 in proportion to the temperature.

When the temperature of the temporary storage tank 4 detected by the temperature sensor 7 further changes from 63° C., which is higher than the threshold temperature T1, or higher to lower than 65° C., the controller 8 performs a control to change the upper limit rotation speed R1 from 5,000 rpm to 4,000 rpm. When the temperature of the temporary storage tank 4 detected by the temperature sensor 7 is within a temperature range of 63° C. or higher and lower than 65° C., the controller 8 changes the upper limit rotation speed R1 in proportion to the temperature.

The controller 8 performs a control to maintain the upper limit rotation speed R1 at a minimum upper limit rotation speed R2 that takes a constant value smaller than the upper limit rotation speed R1 at which the fuel is at the threshold temperature T1 when the temperature of the fuel is equal to or higher than an upper limit temperature T2 that is higher than the threshold temperature T1.

As an example, the upper limit temperature T2 is 65° C. The minimum upper limit rotation speed R2 is 4,000 rpm. In short, the controller 8 imposes the strictest uniform limitation on the engine speed when the temperature of the fuel is 65° C. or higher.

A control performed by the controller 8 to cancel a limitation on the engine speed being the upper limit rotation speed R1 is now described.

The controller 8 limits the engine speed to no more than the upper limit rotation speed R1, and cancels the limitation on the engine speed being the upper limit rotation speed R1 when the temperature of the fuel detected by the temperature sensor 7 becomes lower than the threshold temperature T1.

Specifically, when the temperature of the fuel detected by the temperature sensor 7 becomes lower than the threshold temperature T1 and the engine speed becomes equal to or lower than a predetermined cancel rotation speed that is lower than the upper limit rotation speed R1, the controller 8 cancels the limitation on the engine speed being the upper limit rotation speed R1. As an example, the cancel rotation speed is 600 rpm.

In addition to this, there is the following case in which the limitation on the engine speed being the upper limit rotation speed R1 is canceled. The controller 8 cancels the limitation on the engine speed being the upper limit rotation speed R1 when a predetermined period of time has elapsed since the start of the limitation on the engine speed being the upper limit rotation speed R1. As an example, the predetermined period of time is 200 seconds.

Figure 6:
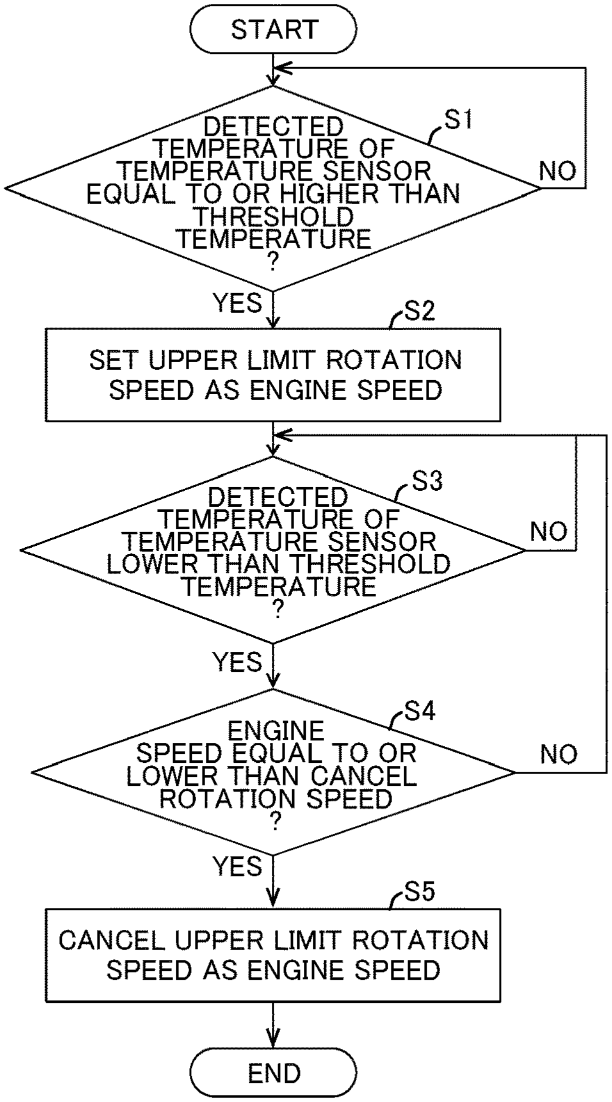
FIG. 6 is a flowchart of a control process executed by a controller to set the upper limit of an engine speed according to a preferred embodiment of the present invention.

A flow of a control process executed by the controller 8 is now described with reference to FIG. 6.

First, in step S1, it is determined whether or not the temperature of the fuel detected by the temperature sensor 7 is equal to or higher than the threshold temperature T1. When it is determined that the temperature of the fuel detected by the temperature sensor 7 is equal to or higher than the threshold temperature T1, the process advances to step S2. When it is determined that the temperature of the fuel detected by the temperature sensor 7 is lower than the threshold temperature T1, the determination in step S1 is repeated.

Then, in step S2, the upper limit rotation speed R1 is set as the engine speed. That is, an operation on a throttle lever (not shown) that causes the engine speed to exceed the upper limit rotation speed R1 is disabled, and the opening degree of the throttle valve 10*a* is limited to a predetermined opening degree. In such a case, the lamp 90 of the notifier 9 lights up to notify the user that the engine speed will not exceed the upper limit rotation speed R1.

In the outboard motor 102, the fuel pumped from the fuel tank 101*a* is added to and mixed with the fuel in the temporary storage tank 4 while the upper limit rotation speed R1 is set as the engine speed such that the temperature of the fuel in the temporary storage tank 4 is lowered.

Then, in step S3, it is determined whether or not the temperature of the fuel detected by the temperature sensor 7 is lower than the threshold temperature T1. In short, it is determined whether or not the temperature of the fuel in the temporary storage tank 4 has been lowered while the upper limit rotation speed R1 is set as the engine speed. When it is determined that the temperature of the fuel detected by the temperature sensor 7 is lower than the threshold temperature T1, the process advances to step S4. When it is determined that the temperature of the fuel detected by the temperature sensor 7 is equal to or higher than the threshold temperature T1, the determination in step S3 is repeated.

Then, in step S4, it is determined whether or not the engine speed is equal to or lower than the cancel rotation speed. When it is determined that the engine speed is equal to or lower than the cancel rotation speed, the process advances to step S5. When it is determined that the engine speed is higher than the cancel rotation speed, the process returns to step S3.

Then, in step S5, the upper limit rotation speed R1 as the engine speed is canceled. In such a case, the lamp 90 of the notifier 9 is turned off. Even when the predetermined period of time has elapsed since the start of the limitation of the engine speed being the upper limit rotation speed R1 as described above, the controller 8 cancels the upper limit rotation speed R1 as the engine speed without going through the above step S3 to step S5.

According to the various preferred embodiments of the present invention described above, the following advantageous effects are achieved.

According to a preferred embodiment of the present invention, the outboard motor 102 includes the controller 8 configured or programmed to perform a control to limit the engine speed to no more than the predetermined upper limit rotation speed R1 based on the detection result of the temperature sensor 7 operable to detect the temperature of the fuel stored in the temporary storage tank 4 while the engine 1 is running. Accordingly, the engine speed is limited to the predetermined upper limit rotation speed R1 based on the temperature of the fuel in the temporary storage tank 4 detected by the temperature sensor 7, and thus an excessive increase in the temperature of the engine 1 is prevented. Thus, the fuel in the temporary storage tank 4 is prevented from reaching a temperature at which it evaporates due to an excessive increase in the temperature of the engine 1. Furthermore, the engine speed is limited to no more than the predetermined upper limit rotation speed R1 such that the amount of fuel consumed by the engine 1 is reduced, and a period of time until all the fuel in the temporary storage tank 4 is consumed is increased. Consequently, the fuel is pumped from the fuel tank 101*a* and mixed with the temperature-raised fuel in the temporary storage tank 4 during the increased period of time such that the temperature of the fuel in the temporary storage tank 4 is effectively lowered. Thus, a decrease in the engine speed not intended or desired by the user, caused by an insufficient fuel supply to the temporary storage tank 4 due to the difficulty (so-called vapor lock) in pumping the fuel from the fuel tank 101*a* to the temporary storage tank 4 caused by vaporization of the fuel in the temporary storage tank 4 while the engine 1 is running, is reduced or prevented.

According to a preferred embodiment of the present invention, the controller 8 is configured or programmed to perform a control to limit the engine speed to no more than the upper limit rotation speed R1 when the temperature of the fuel detected by the temperature sensor 7 is equal to or higher than the threshold temperature T1. Accordingly, the threshold temperature T1 is set as the temperature of the fuel in the temporary storage tank 4, and thus an increase in the temperature of the fuel in the temporary storage tank 4 is further reduced or prevented, and the difficulty (so-called vapor lock) in pumping the fuel from the fuel tank 101*a* to the temporary storage tank 4 caused by vaporization of the fuel in the temporary storage tank 4 is further reduced or prevented.

According to a preferred embodiment of the present invention, the controller 8 is configured or programmed to perform a control to decrease the upper limit rotation speed R1 as the temperature of the fuel increases in the fuel temperature range of the threshold temperature T1 or above. Accordingly, as the fuel has a higher temperature that is equal to or higher than the threshold temperature T1, the engine speed is limited to a lower speed, and thus an excessive increase in the temperature of the engine 1 is more effectively reduced or prevented such that the temperature of the fuel in the temporary storage tank 4 is more effectively lowered.

According to a preferred embodiment of the present invention, the controller 8 is configured or programmed to perform a control to maintain the upper limit rotation speed R1 at the minimum upper limit rotation speed R2 that takes a constant value smaller than the upper limit rotation speed R1 at which the fuel is at the threshold temperature T1 when the temperature of the fuel is equal to or higher than the upper limit temperature T2 that is higher than the threshold temperature T1. Accordingly, even when the temperature of the fuel in the temporary storage tank 4 becomes equal to or higher than the upper limit temperature T2 that is higher than the threshold temperature T1, the maximum value of the engine speed is maintained at the minimum upper limit rotation speed R2. Consequently, when the temperature of the fuel in the temporary storage tank 4 is equal to or higher than the upper limit temperature T2, the maximum value of the limited engine speed is prevented from becoming too small.

According to a preferred embodiment of the present invention, the controller 8 is configured or programmed to limit the engine speed to no more than the upper limit rotation speed R1, and cancel the limitation on the engine speed being the upper limit rotation speed R1 when the temperature of the fuel detected by the temperature sensor 7 becomes lower than the threshold temperature T1. Accordingly, the limitation on the engine speed being the upper limit rotation speed R1 is canceled when the temperature of the fuel detected by the temperature sensor 7 drops below the threshold temperature T1. Therefore, the limitation on the engine speed being the upper limit rotation speed R1 is canceled when the fuel in the temporary storage tank 4 is less likely to vaporize (when a so-called vapor lock is less likely to occur).

According to a preferred embodiment of the present invention, the controller 8 is configured or programmed to cancel the limitation on the engine speed being the upper limit rotation speed R1 when the temperature of the fuel detected by the temperature sensor 7 becomes lower than the threshold temperature T1 and the engine speed becomes equal to or lower than the predetermined cancel rotation speed that is lower than the upper limit rotation speed R1. Accordingly, the limitation on the engine speed being the upper limit rotation speed R1 is not canceled when the engine speed is relatively high, and thus the possibility of another limitation on the engine speed being the upper limit rotation speed R1 due to an excess of the temperature of the fuel detected by the temperature sensor 7 over the threshold temperature T1 immediately after cancellation of the limitation on the engine speed being the upper limit rotation speed R1 is reduced or prevented.

According to a preferred embodiment of the present invention, the controller 8 is configured or programmed to cancel the limitation on the engine speed being the upper limit rotation speed R1 when the predetermined period of time has elapsed since the start of the limitation on the engine speed being the upper limit rotation speed R1. Accordingly, after the predetermined period of time has elapsed in a state in which the engine speed is relatively low to not exceed the upper limit rotation speed R1, the limitation on the engine speed being the upper limit rotation speed R1 is canceled in a state in which the temperature of the fuel detected by the temperature sensor 7 is lowered.

According to a preferred embodiment of the present invention, the outboard motor 102 further includes the notifier 9 to notify the user that the limitation on the engine speed being the upper limit rotation speed R1 has started when the limitation by the upper limit rotation speed R1 has started. Accordingly, the user easily recognizes that the limitation on the engine speed being the upper limit rotation speed R1 has started.

According to a preferred embodiment of the present invention, the outboard motor 102 further includes the manual pump 6*a* provided between the fuel tank 101*a* and the temporary storage tank 4 and manually driven to deliver the fuel from the fuel tank 101*a* into the temporary storage tank 4, and the notifier 9 includes the display 91 to display the predetermined message 91*a* to prompt the user to manually drive the manual pump 6*a* when the limitation on the engine speed being the upper limit rotation speed R1 continues without being canceled. Accordingly, the predetermined message 91*a* on the display 91 allows the user to easily visually recognize that the limitation on the engine speed being the upper limit rotation speed R1 is not canceled, and the manual pump 6*a* is used to manually deliver the fuel from the fuel tank 101*a* into the temporary storage tank 4 such that the temperature of the fuel in the temporary storage tank 4 is lowered.

According to a preferred embodiment of the present invention, the temperature sensor 7 is provided in contact with the outer surface 4*a* of the temporary storage tank 4 to detect the temperature of the fuel via the outer surface 4*a*. Accordingly, the temperature sensor 7 detects the temperature of the fuel without directly contacting the fuel, and thus a decrease in detection accuracy due to adhesion of foreign matter in the fuel to the temperature sensor 7, for example, is prevented.

According to a preferred embodiment of the present invention, the temperature sensor 7 is provided on the lower side of the temporary storage tank 4 in contact with the outer surface 4*a* of the temporary storage tank 4. Accordingly, the temperature sensor 7 provided on the lower side of the temporary storage tank 4 accurately detects the temperature of the fuel even when the amount of fuel in the temporary storage tank 4 is small.

According to a preferred embodiment of the present invention, the controller 8 is configured or programmed to perform a control to change the upper limit rotation speed R1 to within the engine speed range including at least a portion of the range of about 4,000 rpm or more and about 6,000 rpm or less. Accordingly, the engine speed is limited to no more than the upper limit rotation speed R1 such that a decrease in the engine speed not intended or desired by the user, caused by an insufficient fuel supply to the temporary storage tank 4 due to the difficulty (so-called vapor lock) in pumping the fuel from the fuel tank 101*a* to the temporary storage tank 4 caused by vaporization of the fuel in the temporary storage tank 4, is reduced or prevented.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the process operations performed by the controller are described using a flowchart in a flow-driven manner in which processes are performed in order along a process flow for the convenience of illustration in preferred embodiments described above, the present invention is not restricted to this. In a preferred embodiment of the present invention, the process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While the temperature sensor is preferably placed outside the temporary storage tank in contact with the outer surface of the temporary storage tank in preferred embodiments described above, the present invention is not restricted to this. In a preferred embodiment of the present invention, the temperature sensor may alternatively be placed inside the temporary storage tank.

While the temperature sensor is preferably on the lower side of the temporary storage tank in preferred embodiments described above, the present invention is not restricted to this. In a preferred embodiment of the present invention, the temperature sensor may alternatively be on the upper side of the temporary storage tank.

While the threshold for the temperature of the fuel detected by the temperature sensor is preferably 60° C. in preferred embodiments described above, the present invention is not restricted to this. In a preferred embodiment of the present invention, the threshold for the temperature of the fuel detected by the temperature sensor may alternatively be different from 60° C.

While the upper limit of the engine speed is preferably varied in the range of 4,000 rpm or more and 6,000 rpm or less in preferred embodiments described above, the present invention is not restricted to this. In a preferred embodiment of the present invention, the upper limit of the engine speed may alternatively be varied in a range different from the range of 4,000 rpm or more and 6,000 rpm or less.

While the controller preferably cancels the limitation on the engine speed being the upper limit rotation speed based on both the information on the engine speed and the information on the temperature of the fuel detected by the temperature sensor in preferred embodiments described above, the present invention is not restricted to this. In a preferred embodiment of the present invention, the controller may alternatively cancel a limitation on the engine speed being the upper limit rotation speed based on only the information on the temperature of the fuel detected by the temperature sensor.

While the upper limit of the engine speed preferably changes in preferred embodiments described above, the present invention is not restricted to this. In a preferred embodiment of the present invention, the upper limit of the engine speed may alternatively be a constant value that does not change.

While the cancel rotation speed at which limitation on the engine speed being the upper limit rotation speed is canceled is preferably 600 rpm in preferred embodiments described above, the present invention is not restricted to this. In a preferred embodiment of the present invention, the cancel rotation speed may alternatively be different from 600 rpm.

While the marine vessel preferably includes only one outboard motor in preferred embodiments described above, the present invention is not restricted to this. In a preferred embodiment of the present invention, the marine vessel may alternatively include a plurality of outboard motors.

While the outboard motor is preferably an engine-driven outboard motor operable to drive a propeller by only an engine in preferred embodiments described above, the present invention is not restricted to this. In a preferred embodiment of the present invention, the outboard motor may alternatively be a hybrid outboard motor operable to drive a propeller not only by an engine but also by an electric motor.

While the notifier preferably includes the lamp and the display in preferred embodiments described above, the present invention is not restricted to this. In a preferred embodiment of the present invention, the notifier may alternatively include a sound generator to emit a predetermined sound to notify the user that a limitation on the engine speed being the upper limit rotation speed has started when the limitation by the upper limit rotation has started, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
- an engine;
- a fuel pump to draw fuel into an outboard motor body from a fuel tank installed on a hull;
- a temporary storage tank to temporarily store the fuel drawn into the outboard motor body by the fuel pump;
- a fuel injector to inject the fuel stored in the temporary storage tank into the engine;
- a temperature sensor on the temporary storage tank to detect a temperature of the fuel stored in the temporary storage tank; and
- a controller configured or programmed to perform a control to limit an engine speed to no more than a predetermined upper limit rotation speed based on a detection result of the temperature sensor while the engine is running.

2. The outboard motor according to claim 1, wherein the controller is configured or programmed to perform a control to limit the engine speed to no more than the upper limit rotation speed when the temperature of the fuel detected by the temperature sensor is equal to or higher than a threshold temperature.

3. The outboard motor according to claim 2, wherein the controller is configured or programmed to perform a control to decrease the upper limit rotation speed as the temperature of the fuel increases to the threshold temperature or above.

4. The outboard motor according to claim 3, wherein the controller is configured or programmed to perform a control to maintain the upper limit rotation speed at a constant minimum upper limit rotation speed, smaller than the upper limit rotation speed at which the fuel is at the threshold temperature when the temperature of the fuel is equal to or higher than an upper limit temperature higher than the threshold temperature.

5. The outboard motor according to claim 2, wherein the controller is configured or programmed to limit the engine speed to no more than the upper limit rotation speed, and cancel a limitation on the engine speed being the upper limit rotation speed when the temperature of the fuel detected by the temperature sensor becomes lower than the threshold temperature.

6. The outboard motor according to claim 5, wherein the controller is configured or programmed to cancel the limitation on the engine speed being the upper limit rotation speed when the temperature of the fuel detected by the temperature sensor becomes lower than the threshold temperature and the engine speed becomes equal to or lower than a predetermined cancel rotation speed lower than the upper limit rotation speed.

7. The outboard motor according to claim 1, wherein the controller is configured or programmed to cancel a limitation on the engine speed being the upper limit rotation speed when a predetermined period of time has elapsed since a start of the limitation on the engine speed being the upper limit rotation speed.

8. The outboard motor according to claim 1, further comprising:
- a notifier to notify a user that a limitation on the engine speed being the upper limit rotation speed has started when the limitation by the upper limit rotation speed has started.

9. The outboard motor according to claim 8, further comprising:
- a manual pump between the fuel tank and the temporary storage tank to be manually driven to deliver the fuel from the fuel tank into the temporary storage tank; wherein
- the notifier includes a display to display a predetermined message to prompt the user to manually drive the manual pump when the limitation on the engine speed being the upper limit rotation speed continues without being canceled.

10. The outboard motor according to claim 1, wherein the temperature sensor is in contact with an outer surface of the temporary storage tank to detect the temperature of the fuel via the outer surface.

11. The outboard motor according to claim 10, wherein the temperature sensor is on a lower side of the temporary storage tank in contact with the outer surface of the temporary storage tank.

12. The outboard motor according to claim 3, wherein the controller is configured or programmed to perform a control to change the upper limit rotation speed to within an engine speed range including at least a portion of a range of about 4,000 rpm or more and about 6,000 rpm or less.

13. A marine vessel comprising:
- a hull; and
- an outboard motor installed on the hull; wherein
- the outboard motor includes:
  - an engine;
  - a fuel pump to draw fuel into an outboard motor body from a fuel tank installed on the hull;
  - a temporary storage tank to temporarily store the fuel drawn into the outboard motor body by the fuel pump;
  - a fuel injector to inject the fuel stored in the temporary storage tank into the engine;
  - a temperature sensor on the temporary storage tank to detect a temperature of the fuel stored in the temporary storage tank; and
  - a controller configured or programmed to perform a control to limit an engine speed to no more than a predetermined upper limit rotation speed based on a detection result of the temperature sensor while the engine is running.

14. The marine vessel according to claim 13, wherein the controller is configured or programmed to perform a control to limit the engine speed to no more than the upper limit rotation speed when the temperature of the fuel detected by the temperature sensor is equal to or higher than a threshold temperature.

15. The marine vessel according to claim 14, wherein the controller is configured or programmed to perform a control to decrease the upper limit rotation speed as the temperature of the fuel increases to the threshold temperature or above.

16. The marine vessel according to claim 15, wherein the controller is configured or programmed to perform a control to maintain the upper limit rotation speed at a constant minimum upper limit rotation speed, value smaller than the upper limit rotation speed at which the fuel is at the threshold temperature when the temperature of the fuel is equal to or higher than an upper limit temperature higher than the threshold temperature.

17. The marine vessel according to claim 14, wherein the controller is configured or programmed to limit the engine speed to no more than the upper limit rotation speed, and cancel a limitation on the engine speed being the upper limit rotation speed when the temperature of the fuel detected by the temperature sensor becomes lower than the threshold temperature.

18. The marine vessel according to claim 17, wherein the controller is configured or programmed to cancel the limitation on the engine speed being the upper limit rotation speed when the temperature of the fuel detected by the temperature sensor becomes lower than the threshold temperature and the engine speed becomes equal to or lower than a predetermined cancel rotation speed lower than the upper limit rotation speed.

19. The marine vessel according to claim 13, wherein the controller is configured or programmed to cancel a limitation on the engine speed being the upper limit rotation speed when a predetermined period of time has elapsed since a start of the limitation on the engine speed being the upper limit rotation speed.

20. The marine vessel according to claim 13, wherein the outboard motor further includes a notifier to notify a user that a limitation on the engine speed being the upper limit rotation speed has started when the limitation by the upper limit rotation speed has started.

* * * * *